United States Patent
Locker et al.

(10) Patent No.: US 7,653,835 B2
(45) Date of Patent: Jan. 26, 2010

(54) APPARATUS AND METHODS FOR IMPROVED COMPUTER SYSTEM ERROR REPORTING AND MANAGEMENT

(75) Inventors: Howard J. Locker, Cary, NC (US); Daryl C. Cromer, Cary, NC (US); Randall S. Springfield, Chapel Hill, NC (US); Rod D. Waltermann, Rougemont, NC (US); John C. Mese, Cary, NC (US); Scott E. Kelso, Durham, NC (US); Nathan J. Peterson, Raleigh, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 473 days.

(21) Appl. No.: 11/475,361

(22) Filed: Jun. 27, 2006

(65) Prior Publication Data

US 2008/0010517 A1    Jan. 10, 2008

(51) Int. Cl.
*G06F 11/00* (2006.01)
(52) U.S. Cl. .................................... 714/15; 711/115
(58) Field of Classification Search .................. 714/15
See application file for complete search history.

(56) References Cited

U.S. PATENT DOCUMENTS

| | | | |
|---|---|---|---|
| 5,345,590 A * | 9/1994 | Ault et al. ................ | 718/1 |
| 6,075,938 A * | 6/2000 | Bugnion et al. ............ | 703/27 |
| 6,321,350 B1 | 11/2001 | Baskey et al. ............. | 714/704 |
| 6,332,180 B1 * | 12/2001 | Kauffman et al. .......... | 711/153 |
| 6,381,682 B2 * | 4/2002 | Noel et al. ................ | 711/153 |
| 6,397,242 B1 * | 5/2002 | Devine et al. ............. | 718/1 |
| 6,496,847 B1 | 12/2002 | Bugnion et al. ............ | 718/1 |
| 6,625,751 B1 | 9/2003 | Starovic et al. ............ | 714/11 |
| 6,665,759 B2 * | 12/2003 | Dawkins et al. ........... | 710/200 |
| 2002/0124215 A1 | 9/2002 | Austen et al. ............. | 714/57 |
| 2003/0159086 A1 | 8/2003 | Arndt ....................... | 714/25 |
| 2003/0212883 A1 * | 11/2003 | Lee et al. .................. | 713/1 |
| 2004/0153853 A1 | 8/2004 | Moriki et al. ............. | 714/43 |
| 2005/0097226 A1 * | 5/2005 | Tripathi ................... | 709/250 |
| 2007/0106986 A1 * | 5/2007 | Worley, Jr. ............... | 718/1 |
| 2007/0112772 A1 * | 5/2007 | Morgan et al. ............ | 707/9 |
| 2008/0222309 A1 * | 9/2008 | Shanbhogue ............. | 709/250 |

\* cited by examiner

*Primary Examiner*—Scott T Baderman
*Assistant Examiner*—Kamini Patel
(74) *Attorney, Agent, or Firm*—Patrick J. Daugherty; Driggs, Hogg, Daugherty & Del Zoppo Co., LPA

(57) ABSTRACT

A client computer system is provided with two operating systems, one of which is a user operating system (UOS) and the other of which is a service operating system (SOS), and a hypervisor. In the event of a hang in the first operating system, the second operating system remains active, out of the awareness of the user of the system, and has reporting and command response capabilities beyond those of prior technology.

15 Claims, 3 Drawing Sheets

APPARATUS AND METHODS FOR IMPROVED COMPUTER SYSTEM ERROR REPORTING AND MANAGEMENT

FIELD AND BACKGROUND OF INVENTION

This invention relates to apparatus and methods by which error reporting and management in computer systems are facilitated. More particularly, the invention relates to expanding the capabilities of known techniques for such messaging.

It has been known heretofore that an end user or client computer system, as with other devices used in network technologies, can be configured and enabled to report to a management console problems in operation and received from the console messages commanding certain actions. Such capabilities have, however, suffered from certain limitations. Because of the reliance of some of these messaging standards upon processor activity and the reliance of client computer systems on functionality enabled by operating systems, the reports possible and commands accepted when an operating system fails have been severely restricted to events monitored by sensors in the system and commands to which the system could respond without necessity of an operating system being active.

SUMMARY OF THE INVENTION

With the foregoing in mind, it is one purpose of this invention to expand the capabilities of a client computer system with regard to error reporting and command response. In pursuing this purpose, the present invention contemplates that technologies be combined in a new way to provide for use of a system central processing unit (CPU) even in circumstances where the usual operating system has failed or become corrupted.

In accordance with this invention, a client computer system is provided with two operating systems, one of which is a user operating system (hereinafter sometimes UOS) and the other of which is a service operating system (hereinafter sometimes SOS). In the event of a hang in the first operating system, the second operating system remains active, out of the awareness of the user of the system, and has reporting and command response capabilities beyond those of prior technology.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
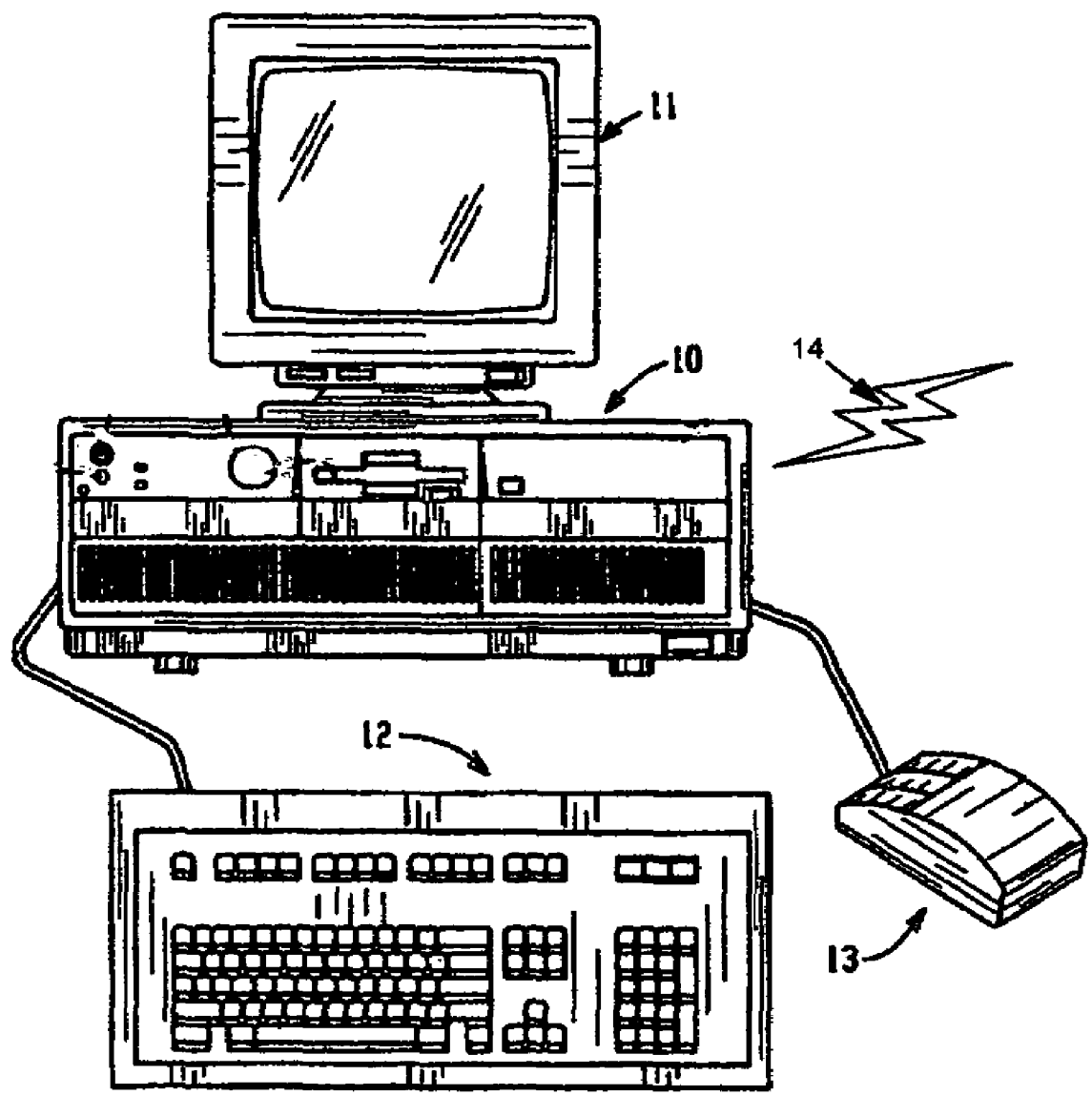
FIG. 1 is a perspective view of an illustrative embodiment of a computer system.

FIG. 1 illustrates a typical computer workstation, here a personal computer system 10. The system includes a central processor, memory accessible to the processor for storing data including programs to be executed, a display 11, input devices including a keyboard 12 and a pointing device (here shown as a mouse 13), a digital data storage device (commonly a hard disk drive) and output devices including a network interface, often known as a NIC. The NIC may implement network connectivity by a wired connection such as an Ethernet connection or by a wireless connection (indicated at 14 in FIG. 1) such as one of the IEEE 802.11 protocols. Such computer systems come in a variety of configurations, some known as notebook systems, others as desktop or deskside systems, some known as servers, and some known as "thin clients". The same technology appears in what are known as handheld computer systems (some of which are also known as PDAs or Personal Digital Assistants) and in certain telephone instruments such as cellular or smart telephones. The present invention may find usefulness with many such systems, depending upon the limitations of each such system, and it is to be understood that the choice of one type of such system for illustration is in no way limiting upon the implementation of this invention. Persons familiar with the arts of computer technology will easily recognize the scope of applicability of what is here described and illustrated. It is contemplated that the principal usefulness will be with user workstations connected with networks, also here called client systems.

Figure 2:
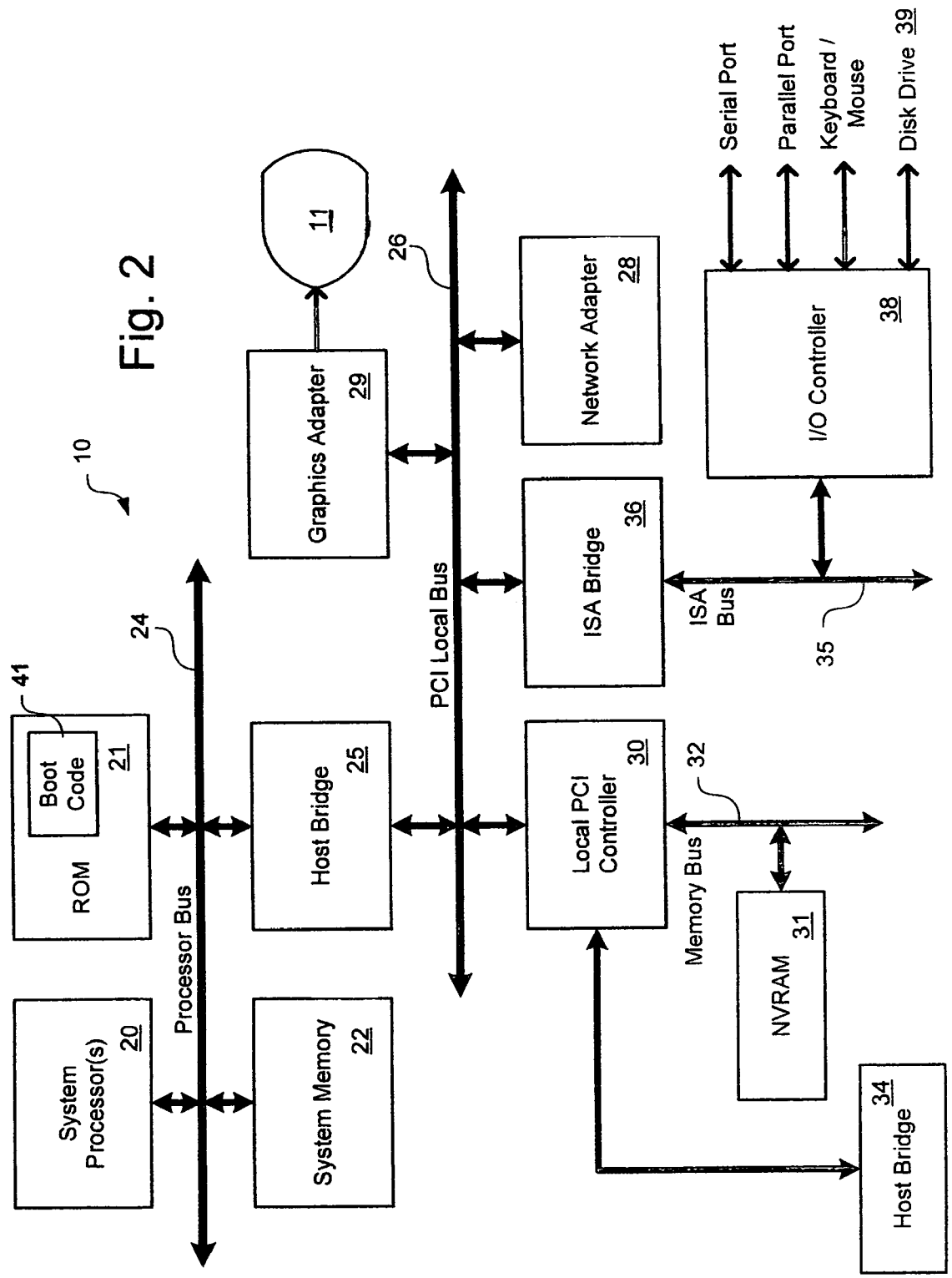
FIG. 2 is a block diagram representation of an illustrative computer system such as the system of FIG. 1.

FIG. 2 is one illustrative embodiment of a computer system which may function as the system 10 of FIG. 1 and which includes a system processor or CPU 20, coupled to a Read-Only Memory (ROM) 21 and a system memory 22 by a processor bus 24. System processor 20 is a general-purpose processor that executes boot code stored within ROM 21 at power-on and thereafter processes data under the control of an operating system and application software stored in system memory 22. System processor 20 is coupled via the processor bus 24 and a host bridge 25 to a Peripheral Component Interconnect (PCI) local bus 26.

The PCI local bus 26 supports the attachment of a number of devices, including adapters and bridges. Among these devices is a network adapter or NIC 28, which interfaces the computer system 10 to a LAN (wired or wireless), and graphics adapter 29, which interfaces the computer system 10 to the display 11. Communication on the PCI local bus 26 is governed by a local PCI controller 30, which is in turn coupled to non-volatile random access memory (NVRAM) 31 via a memory bus 32. Local PCI controller 30 can be coupled to additional buses and devices via a second host bridge 34.

Computer system 10 further may include an Industry Standard Architecture (ISA) bus 35, which is coupled to the PCI local bus 26 by an ISA bridge 36. Coupled to the ISA bus 35 is an input/output (I/O) controller 38, which controls communication between computer system 10 and attached peripheral devices such as a keyboard 12, mouse 13, and a disk drive 39 on which software is stored as digital data. In addition, I/O controller 38 supports external communication by computer system 10 via serial and parallel ports. Alternatively, more recently designed systems may use a PCI Express service for such functions as graphics.

A client system such as the system 10 will have a user operating system (UOS, indicated at 40 in FIG. 3) which conventionally may be a product of Microsoft Corporation or of a Linux distributor. The UOS will be executable computer code stored on the storage device 38 of the system accessibly to the system CPU 20 which, when executing on the computer system, instantiates an operating system. Underlying the UOS is a hypervisor layer 41 interposed between the UOS 40 and the hardware of the system 10.

"Hypervisor" is a term of art which has been used to refer to a virtual machine monitor (VMM)—a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels. The operating systems will share resource access. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

The interested reader is referred to the literature, which describes virtual machines and virtual machine monitors which arose out of the need to run applications written for different operating systems concurrently on a common hardware platform, or for the full utilization of available hardware resources. Virtual machine monitors were the subject of research since the late 1960's and came to be known as the "Virtual Machine Monitor" (VMM). Persons of ordinary skill in the art are urged to refer to, for example, R. P. Goldberg, "Survey of Virtual Machine Research," IEEE Computer, Vol. 7, No. 6, 1974. During the 1970's, as a further example, International Business Machines Corporation adopted a virtual machine monitor for use in its VM/370 system.

Figure 3:
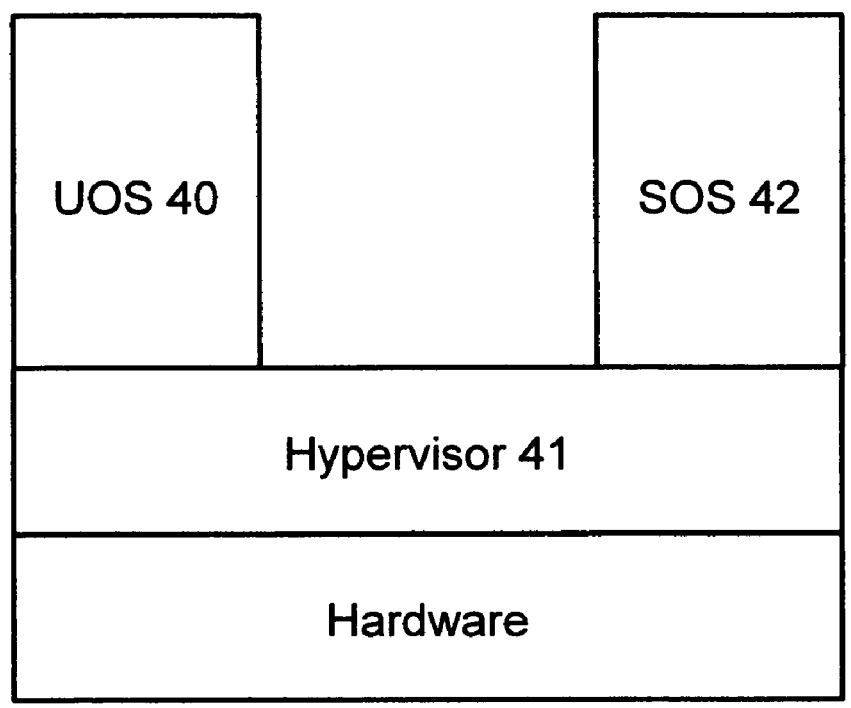
FIG. 3 is a block diagram representation of certain hardware and software elements embodying the present invention.

In accordance with the present invention, the presence of the hypervisor layer 31 enables the instantiation of a second operating system in the computer system 10, indicated at 42 in FIG. 3 and here identified as a service operating system or SOS. The SOS 42 is used for client manageability and may be, as the UOS may be, a product of Microsoft Corporation or of a Linux distributor.

The present invention contemplates that the executable computer code stored on said storage device 38 accessibly to the computer system CPU 20, when executing on the computer system, instantiates first and second operating systems (the UOS and SOS) and a hypervisor which enables the first and second operating systems to function simultaneously. One of the operating systems controls the physical network interface or NIC 28. The hypervisor 41 provides alert standard format services through the SOS and NIC which exchanges messages with a management console.

Mention was made herein above of industry standard protocols for exchange of information between networked devices and management consoles. One such standard which of particular significance to this invention is known as the Alert Standard Format or ASF. Details are available in a white paper published by the Distributed Management Task Force and found at http://www.dmff.org/education/technote_ASF-.pdf. This standard in a normal implementation allows a client system to notify a management console of limited error conditions when in an operating system absent condition. That is, when the normal (or UOS) operating system in a client system is non-functional, the ASF allows limited data communication through an enabled NIC and limited response to a certain vocabulary of commands.

The present invention contemplates a substantial enhancement of the capabilities of such notifications and responses. More particularly, by providing code instantiating first and second operating systems and a hypervisor layer and providing that the SOS is outside the attention of a user of said system, the present invention allows full access to the system CPU 20 during absence or failure of the UOS and thus full reporting of the system conditions and full access for responding to a wide range of management console commands.

Here, the SOS controls the physical NIC, and the UOS functions through a virtual NIC. This enables the management console, if needed, to gather detailed reports on the state of the client system 10 and issue commands to perform and necessary diagnostics or corrections.

Figure 4:
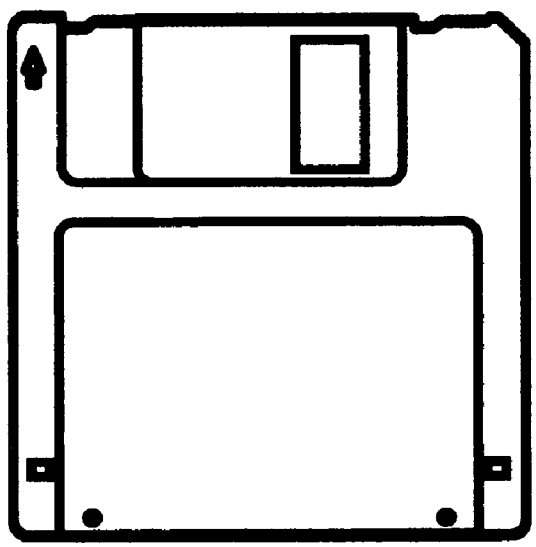
FIG. 4 is an illustration of one form of computer readable media on which the program elements of the present invention may be distributed.

It will be apparent that this invention is implemented in hardware and in software-apparatus and methods. The methods of this invention include providing a computer system with executable computer code which, when executing on said computer system, instantiates first and second operating systems and a hypervisor which enables said first and second operating systems to function simultaneously; and providing in the hypervisor alert standard format services which exchange messages with a management console. Further, the methods include producing computer executable program code, storing the produced program code on a computer readable medium; and providing the program code to be deployed to and executed on a computer system to execute instructions as described immediately above. Such code may be distributed by depositing a copy on a computer readable medium such s a diskette 40 shown in FIG. 4. The choice of a diskette for illustration is simply that—an illustration—as such media come in a variety of forms including hard drives, flash memory and other devices. Distribution may be by loading the code onto such a medium through a network distribution.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a computer system having a physical network interface and a storage device; and
   executable computer code stored on said storage device accessibly to said computer system which, when executing on said computer system, instantiates first and second operating systems and a hypervisor which enables said first and second operating systems to function simultaneously;
   wherein the first operating system is a user operating system employed by a user of the computer system and functions through a virtual network interface;
   wherein the second operating system is a service operating system executed on the computer system outside the attention of the user, the service operating system controlling said physical network interface;
   said hypervisor providing alert standard format services which exchanges messages with a management console and enables the service operating system full access to the computer system and reporting of user operating system error conditions to the management console through the physical network interface when the computer system is in a user operating system absent condition.

2. A method for computer system error reporting and management, comprising:
providing a computer system with executable computer code which, when executing on said computer system comprising a physical network interface, instantiates first and second operating systems and a hypervisor which enables said first and second operating systems to function simultaneously;
wherein the first operating system is a user operating system employed b a user of the computer system and functioning through a virtual network interface;
wherein the second operating system is a service operating system executed on the computer system outside the attention of the user, the service operating system controlling said physical network interface; and
providing in the hypervisor alert standard format services exchanging messages with a management console and enabling the service operating system full access to the computer system and reporting of system error conditions to the management console through the physical network interface when the computer system is in a user operating system absent condition.

3. A method for computer system error reporting and management, comprising:
producing computer executable program code;
storing the produced program code on a computer readable medium; and
providing the program code to be deployed to and executed on a computer system;
the program code comprising instructions which, when executing on the computer system:
provide the computer system with code which, when executing on said computer system, instantiates first and second operating systems and a hypervisor which enables said first and second operating systems to function simultaneously;
wherein the first operating system is a user operating system employed b a user of the computer system and functions through a virtual network interface;
wherein the second operating system is a service operating system executed on the computer system outside the attention of the user, the service operating system controlling said physical network interface; and
provide in the hypervisor alert standard format services which exchange messages with a management console and enables the service operating system full access to the computer system and reporting of user operating system error conditions to the management console through the physical network interface when the computers system is in a user operating system absent condition.

4. The apparatus of claim 1 wherein the standard format services enable the central processing unit to respond to commands from the management console through the physical network interface when the user operating system is in a non-functional state.

5. The apparatus of claim 4 wherein the management console is enabled to gather detailed reports on a state of the computer system and issue commands to perform necessary diagnostics or corrections when the user operating system is in the non-functional state.

6. The apparatus of claim 5 wherein the non-functional state of the user operating system is selected from the group consisting of the user operating system has failed, the user operating system is corrupted and the user operating system is absent.

7. The apparatus of claim 6 wherein the commands from the management console are selected from a certain vocabulary of commands.

8. The method of claim 2 wherein the standard format services enable the central processing unit to respond to commands from the management console through the physical network interface when the user operating system is in a non-functional state.

9. The method of claim 8 wherein the management console is enabled to gather detailed reports on a state of the computer system and issue commands to perform necessary diagnostics or corrections when the user operating system is in the non-functional state.

10. The method of claim 9 wherein the non-functional state of the user operating system is selected from the group consisting of the user operating system has failed, the user operating system is corrupted and the user operating system is absent.

11. The method of claim 10 wherein the commands from the management console are selected from a certain vocabulary of commands.

12. The method of claim 3, further comprising the standard format services enabling the central processing unit to respond to commands from the management console through the physical network interface when the user operating system is in a non-functional state.

13. The method of claim 12, further comprising enabling the management console to gather detailed reports on a state of the computer system and issue commands to perform necessary diagnostics or corrections when the user operating system is in the non- functional state.

14. The method of claim 13 wherein the non-functional state of the user operating system is selected from the group consisting of the user operating system has failed, the user operating system is corrupted and the user operating system is absent.

15. The method of claim 14 wherein the commands from the management console are selected from a certain vocabulary of commands.

* * * * *

UNITED STATES PATENT AND TRADEMARK OFFICE
CERTIFICATE OF CORRECTION

PATENT NO. : 7,653,835 B2  Page 1 of 1
APPLICATION NO. : 11/475361
DATED : January 26, 2010
INVENTOR(S) : Locker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Twenty-third Day of November, 2010

David J. Kappos
*Director of the United States Patent and Trademark Office*